US010035520B2

(12) United States Patent
Fenile

(10) Patent No.: US 10,035,520 B2
(45) Date of Patent: Jul. 31, 2018

(54) CARRIAGE FOR A CONVEYING SYSTEM AND A CONVEYING SYSTEM WITH CARRIAGES

(71) Applicant: Ferag AG, Hinwil (CH)

(72) Inventor: Roberto Fenile, Wetzikon (CH)

(73) Assignee: FERAG AG, Hinwil (CH)

(*) Notice: Subject to any disclaimer, the term of this patent is extended or adjusted under 35 U.S.C. 154(b) by 0 days.

(21) Appl. No.: 15/421,564

(22) Filed: Feb. 1, 2017

(65) Prior Publication Data
US 2017/0225693 A1 Aug. 10, 2017

(30) Foreign Application Priority Data

Feb. 4, 2016 (CH) .................................. 153/16

(51) Int. Cl.
B65G 9/00 (2006.01)
B65G 17/20 (2006.01)
B65G 21/20 (2006.01)
B61B 3/00 (2006.01)
B65G 19/02 (2006.01)

(52) U.S. Cl.
CPC .............. B61B 3/00 (2013.01); B65G 9/002 (2013.01); B65G 9/008 (2013.01); B65G 17/20 (2013.01); B65G 19/025 (2013.01); B65G 2812/02732 (2013.01)

(58) Field of Classification Search
CPC ........ B65G 9/002; B65G 9/008; B65G 17/20; B65G 19/025; B65G 21/22; B65G 9/00; B61B 3/00
See application file for complete search history.

(56) References Cited

U.S. PATENT DOCUMENTS 1,159,388 A 11/1915 Jacobs
3,056,359 A 10/1962 Fey
(Continued)

FOREIGN PATENT DOCUMENTS

CH 710022 2/2016
DE 1276679 9/1968
(Continued)

OTHER PUBLICATIONS

Switzerland Search Report dated Mar. 14, 2016, Application No. 00153/16.
Jorgl, "Conveying technics: SkySorter for tight spaces", Logistic Today, Sep. 1, 2015, pp. 1-4, https://www.logistik-heute.de/Logistik-News-Logistik-Nachrichten/Markt-News/10552/Neue-Europaeische-Technologie-Plattform-fuer-Logistik-ins-Leben-gerufen-Fors, English translation included.

Primary Examiner — Mark A Deuble
(74) Attorney, Agent, or Firm — Rankin, Hill & Clark LLP

(57) ABSTRACT

A carriage for a rail-guided conveying system includes a carriage body, which is designed for embracing a runner rail and which includes a first and a second limb. The limbs are connected to one another by way of a transversely extending connecting section. The first limb has a first roller pair and the second limb has a second roller pair. The first and the second roller pair of the two limbs are arranged crosswise equal and offset to one another. In each case a first runner roller of the first and of the second roller pair is designed as a support roller, via which the load of the carriage can be transmitted onto the runner rail, and a second roller of the first and second roller pair is designed as a guide roller for guiding the carriage along the runner rail.

15 Claims, 6 Drawing Sheets

(56) References Cited

U.S. PATENT DOCUMENTS

| | | | |
|---|---|---|---|
| 3,086,482 A * | 4/1963 | Fiegel | B65G 17/20 |
| | | | 104/94 |
| 3,627,595 A * | 12/1971 | Leach | B61B 12/02 |
| | | | 198/683 |
| 4,265,181 A | 5/1981 | Schreyer et al. | |
| 4,484,525 A | 11/1984 | Forshee et al. | |
| 8,042,474 B2 * | 10/2011 | Perakis | A63G 21/22 |
| | | | 104/112 |
| 2003/0019928 A1 | 1/2003 | Vande Berg | |
| 2003/0103697 A1 * | 6/2003 | Mochizuki | B65G 9/002 |
| | | | 384/44 |
| 2006/0185966 A1 * | 8/2006 | Eberle | B65G 17/20 |
| | | | 198/785 |
| 2009/0301341 A1 | 12/2009 | Maier | |
| 2016/0031648 A1 * | 2/2016 | Prussmeier | B65G 54/02 |
| | | | 104/107 |
| 2016/0046444 A1 * | 2/2016 | Fenile | B65G 19/025 |
| | | | 198/687.1 |
| 2017/0174435 A1 * | 6/2017 | Fenile | B65G 19/025 |

FOREIGN PATENT DOCUMENTS

| | | |
|---|---|---|
| DE | 1950151 | 4/1971 |
| DE | 29 45 169 | 5/1980 |
| DE | 84 09 917 | 9/1984 |
| DE | 102 24 882 | 2/2003 |
| DE | 10 2010 060 547 | 5/2012 |
| DE | 10 2011 004 783 | 8/2012 |
| DE | 20 2012 009 625 | 12/2012 |
| EP | 0 856 480 | 8/1998 |
| EP | 1 980 302 | 10/2008 |
| GB | 877964 | 9/1961 |
| JP | 10-2330 | 1/1998 |
| JP | 2008-155787 | 7/2008 |

* cited by examiner

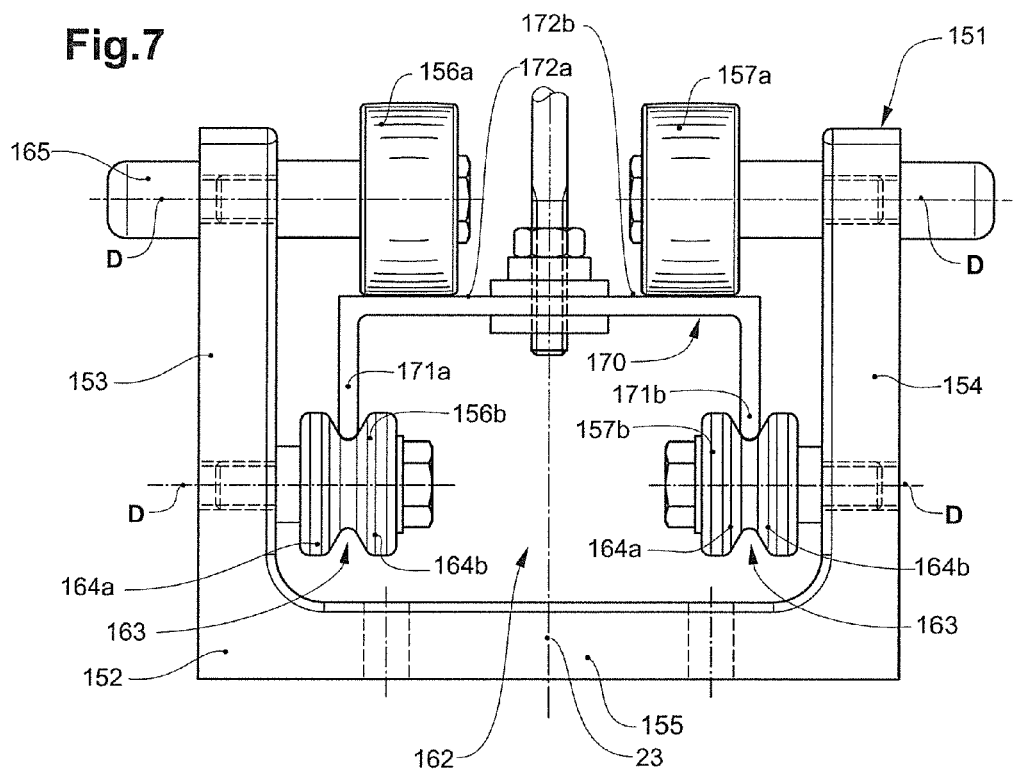
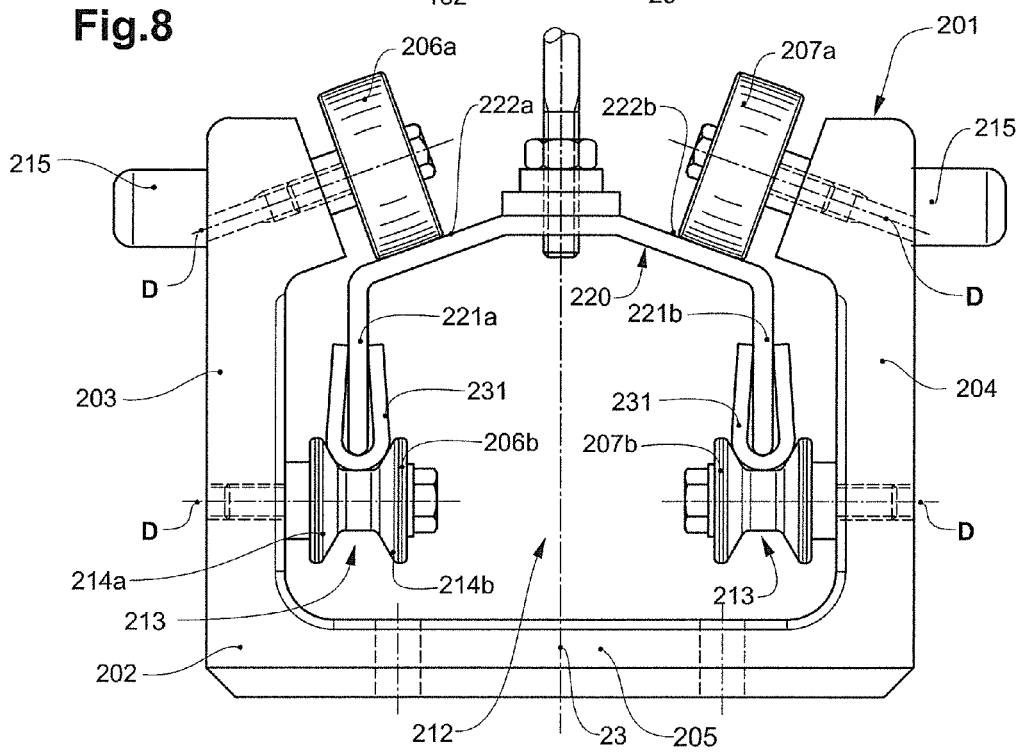

CARRIAGE FOR A CONVEYING SYSTEM AND A CONVEYING SYSTEM WITH CARRIAGES

BACKGROUND OF THE INVENTION

Field of the Invention

The invention lies in the field of transporting and conveying technology, in particular intra-logistics. The invention relates to a carriage for a rail-guided conveying system, in particular for a suspended-conveying system, including a carriage body that is designed for embracing a runner rail and which has a first and a second limb, wherein the limbs are connected to one another by way of a transversely extending connecting section.

Description of Related Art

The first limb has a first roller pair, which is attached on its inner side. The second limb has a second roller pair, which is attached on its inner side. The first and the second roller pair of the two limbs are arranged offset to one another in an equal and opposite crosswise manner.

The term "equal and opposite" can also be read as equal but opposite.

The invention moreover relates to a conveying system, in particular to a suspended-conveying system, with carriages and with a runner rail, along which the carriages are rollingly movable for conveying, in particular for the suspended-conveying, of conveyed goods.

In automated warehouses, extensive production facilities and very generally with the conveying of goods, there exists the need to convey goods between processing stations, to intermediately store them in warehouses and to retrieve them again from the warehouses, as well as to prepare them for dispatch, by way of suspended-conveying devices.

Thus in suspended-conveying devices, it is known from the state of the art, to convey objects such as clothes, but also conveying pockets receiving a conveyed article, by way of carriages that roll along a runner rail via rollers.

The published document EP 0 856 480 B1 thus describes a carriage that is designed as an outer runner and has a carriage body constructed of two limbs connected to one another via a transversely running connecting section. In each case, two rollers are arranged offset to one another in a crosswise manner, on the inner side of the limbs.

The carriage body at the outer side has a runner rail, which is designed as a flat profile, wherein upper rollers run on upper running surfaces and lower rollers run on lower running surfaces, of the flat profile.

The track guidance is ensured by way of roller flanges, which are arranged on the rollers at the outer side and which limit or prevent a movement of the carriage transverse to the running direction.

The rollers are guided on the runner rail is a manner in which they are largely free of play, so as to ensure a stable guidance of the carriage along the runner rail, despite the short wheel/roller distance.

The carriage according to EP 0 856 480 B1 has the disadvantage that the largely play-free guidance of the carriage along the runner rail can lead to an increased wear and in the worst case to a jamming of the carriage on the runner rail, e.g. with curved travel.

However, if the rollers have play with respect to the runner rail, then the guidance along the runner rail loses its smoothness and becomes unstable in the worst case. The carriage wobbles on the runner rail.

Moreover, it is necessary for the runner rail in each case to form two lateral lower and upper running surfaces, which lie opposite one another in pairs, for a stable guidance of the carriage, and this entails significant limitations in the design of the runner rail.

SUMMARY OF THE INVENTION

It is therefore the object of the present invention, to suggest a carriage and a conveying system, which permit a stable, secure, quiet and reliable movement of the carriage along the runner rail, in particular also with travel past bends, which is to say curved travel.

The carriage should moreover be space-saving, so that several constructionally equal carriages, which are compactly arranged one after the other in group formation, take up as little as possible space along the conveying track. Constructionally equal means that the carriages each have the same shape and dimension, which is to say geometry.

The carriage according to the invention has, in each case, a first roller of the first and of the second roller pair is designed as a support roller, via which the load of the carriage can be transmitted onto the runner rail.

In each case, a second roller of the first and second roller pair is moreover designed as a guide roller for guiding the carriage along the runner rail.

In this arrangement, the guide rollers, apart from accommodating centripetal forces as well yawing and rolling moments, also have the function of accommodating pitching and tilting moments.

The guide roller in particular in each case forms a limitation restricting a displacement of the carriage in the two directions that are parallel to the rotation axis of the guide roller and opposite to one another.

According to a further development, the guide rollers each have a guide recess, which is peripherally closed in the rotation direction and which is surrounded on both sides by a guide flank. The guide recess serves for receiving the guide bar of a runner rail for the purpose of guiding the carriage along the runner rail. The guide bar can engage into the guide recess for this.

The support rollers in particular have no lateral guide flank, which is to say roller flange, for the lateral guidance. The running surface of the support rollers can be plane or cambered, transversely to the rotation direction.

The support rollers are further characterised in that the weight load of the carriage is transmitted onto the runner rail via the support rollers. Thus, in particular, the total weight load can be transmitted onto the runner rail via the support rollers. The carriage accordingly lies on the runner rail via the support rollers.

The guide rollers serve for guiding the carriage such that its running direction essentially corresponds to that of the runner rail. For this, the guide rollers need to accommodate in particular lateral forces. These lateral forces in particular act upon the guide flanks.

In curved sections (bends), the guide rollers thus accommodate, for example, the centripetal forces acting upon the carriage. Moreover, the guide rollers also accommodate yawing moments, thus rotation moments about axes which are vertical to the running direction, as well as rolling moments, thus rotation moments about axes aligned parallel to the running direction.

Yawing moments are produced, for example, by way of drive forces that engage on the carriage in an off-centred manner. This is the case, for example, if the carriage is driven at one side via a driver contact element, which is arranged laterally on the carriage.

The guide rollers now prevent the carriage from jamming or the support rollers from coming into contact with parts of the runner rail that are not running surfaces.

The guide rollers in particular are not provided for transmitting weight loads of the carriage onto the runner rail. Thus, one can envisage no loads at all being transmitted from the guide roller onto the runner rail. This is particularly the case if the guide rollers are arranged below the guide section of the runner rail, such as guide bars or rolling surfaces, said section cooperating with the guide roller.

Since the guide rollers in particular accommodate no loads, then these can basically have a smaller diameter than the support rollers.

The guide recess according to the special embodiment of the guide roller which is mentioned above is now arranged in particular centrally on the guide roller.

The guide recess, which is surrounded on both sides by a guide flank, in particular can be a guide channel, a guide slot or a guide groove. The guide recess can be V-shaped. The guide recess can be U-shaped.

The guide recess is now designed in particular such that the guide bar of the runner rail can engage uprightly into the guide recess.

The guide flank can be, for example, a roller flange (track flange).

According to a further development, the rotation axes of the guide rollers and of the support rollers run parallel to one another.

According to a further development, the rotation axes of the guide rollers run perpendicularly to the middle longitudinal plane of the carriage. This means that the support rollers are accordingly arranged in a standing manner.

The middle longitudinal plane runs parallel to the running direction of the carriage, through the rail receiving space between the two limbs. The middle longitudinal plane in particular represents a plane of symmetry of the carriage.

The feature "arranged in a standing manner" also means that, in the case of a horizontal conveying track, the rotation axes of the rollers are likewise arranged horizontally and transversely to the running direction.

According to a further development, the rotation axes of the carrier rollers run perpendicularly to the middle longitudinal plane of the carriage. The guide rollers are accordingly arranged in a standing manner.

According to a further development, the rotation axes of the guide rollers can also run inclined with respect to the middle longitudinal plane mentioned above and enclose an angle of less than 90°.

According to a further development, the rotation axes of the support rollers can also run inclined with respect to the middle longitudinal plane mentioned above and enclose an angle of less than 90°.

According to a further development, the rotation axes of the guide roller and of the support roller of a roller pairing on the respective limb enclose an acute angle in the parallel projection in the running direction. The rotation axes in each case diverge towards the opposite limb.

The carriage as a whole can include in particular exactly two roller pairs, each with a support roller and a guide roller.

The roller or roller pairs, which are arranged offset in a crosswise manner, in particular have an "X"-shaped arrangement in a parallel projection parallel to their rotation axes.

The support roller and the guide roller of a roller pair can be arranged in a common plane. The support roller and the guide roller of a roller pair can also be arranged offset to one another along their rotational axes.

Thanks to the arrangement of the first and second roller pair described above, pitching or tilting movements, thus torques about axes aligned laterally to the running direction, relative to the runner rail are accommodated. Tilting moments in particular act given ascending or descending conveying track sections, as well as with changing speeds.

An oscillating or wobbling of the carriage or of the conveyed goods conveyed with this can be prevented in the case of changing accelerations on account of this.

The arrangement of the rollers on the limbs can now be of such nature that several carriages, which are compactly rowed onto one another form a first, e.g. upper row and a second, e.g. lower row of rollers arranged one after the other in the running direction in each case, on the respective limbs.

According to a further development, the support roller is arranged on the limb in particular towards the free end of the limb, and the guide roller is arranged on the limb towards the connecting section.

As already mentioned, the limbs each have an inner side facing the runner rail, as well as further an outwardly facing outer side opposed to the inner side. The limbs moreover each have a front limb face side facing the running direction and a rearward limb face facing opposite to the running direction.

According to a further development of the invention, the two limb face sides of a limb form at least one pairing of a face side section, which projects in the running direction or counter to the running direction, and of a recessed face side section, wherein these sections at the limb face sides are designed equally and oppositely to one another and are arranged in a manner such that the projecting and recessed face side section of the limbs of two equally constructed carriages pushed onto one another along the running direction engage into one another, in particular positively engage into one another it, at their limb face sides.

This means that the contour of the mentioned face side section of the front limb face side of a trailing carriage, engages, in particular positively, into the contour of the equally and oppositely designed face side section of the rear-side limb face side of a directly leading, equally constructed carriage.

The projecting face side section in particular is a projection and very particularly is a bulge. The recessed face side section in particular is a recess and very particularly is an indentation.

The pivots of the support rollers can be arranged in a projecting face side section.

The pivots of the guide rollers can be arranged in a projecting face side section.

According to a particular embodiment of the invention, each face side section of a limb in each case has a projecting face side section, in particular a projection, and a recessed face side section, in particular an indentation. The mentioned face side sections are arranged next to one another considered along the limb axis. The mentioned face side sections of a limb are designed in particular equally and oppositely.

The face side sections, which are designed in an equal and opposite manner and which engage into one another, in particular ensure a securing against a displacement of two adjacent carriages relative to one another along an axis perpendicular to the running direction and perpendicular to the rotation axes of the rollers.

This means that in a hanging position, two adjacent constructionally equal carriages, which bear on one another are secured against a vertical displacement relative to one another.

The securing of the carriages against a vertical relative displacement has the effect that loads can be transmitted between adjacent carriages bearing on one another. This, for example, permits a load compensation between the carriages in a lined-up, i.e. backed-up storage formation.

The movement of the carriages in a grouped formation is further improved thanks to the mutual blocking of the carriages with respect to a vertical relative displacement, which is mentioned above.

According to a further development of the invention, the contours of the limb face sides of a limb as a whole can each be designed equally and oppositely to one another in a manner such that the contour of the front limb face side of a trailing, equally constructed carriage can positively engage into the contour of the rear-side limb face side of a directly leading, equally constructed carriage.

According to a further development of the invention, the design of the limbs of the carriage and the arrangement of the rollers on the limbs are such that rollers of equally constructed carriages pushed on one another in the running direction overlap at the inner side with the adjacent limbs of the directly leading or trailing carriage.

The guide rollers are each fastened on the carriage body via an in particular rotationally fixed fastening pivot. The fastening pivot in particular is rigid.

According to a further development, the guide rollers are pushed onto a fastening pivot arranged on the carriage body in a rotationally fixed manner, and are screwed to the carriage body.

Since the guide rollers accommodate no loads, these roller can be rotatably mounted on the carriage body with bearings that are less expensive compared to the support rollers.

The guide rollers can be fastened to the carriage body in particular with lateral play. The lateral play should permit a lateral displacement of the guide rollers along their geometric rotation axis.

The guide rollers can thus each be rotatably and laterally slidingly displaceably mounted on the carriage body, on a rotationally fixed fastening pivot.

According to a further development of the invention, the guide rollers are arranged on or fastened to the carriage body with radial play. The radial play is to permit a displacement of the guide rollers in a plane transverse to their geometric rotation axis, thus in particular a radial displacement.

The play in particular is to prevent an excessive wearing or even a jamming of the carriages in bend (curved) sections. The wear or the jamming of the carriages in bend (curve) sections is explained by the changed geometric conditions at the runner rail in the curved sections. Specifically, the distances of the contact points of the support roller and of the guide roller of a roller pairing hence change relative to one another in curved sections of the runner rail.

The arrangement or fastening of the guide rollers with play is now to solve the above mentioned problem, by way of the guide rollers in each case being able to slightly change their position relative to the support rollers, in order to thus compensate these changed distances.

The play of the guide rollers does not have a negative impact on the running stability of the carriage along the runner rail due to the fact that the guide rollers are not envisaged for accommodating loads.

The lateral play for example can be 0.1 mm or more, in particular 0.2 mm or more. The lateral play for example can be 2 mm or less, in particular 1 mm or less.

The radial play for example can be 0.1 mm or more, in particular 0.2 mm or more. The radial play for example can be 2 mm or less, in particular 1 mm or less.

The inventive fastening of the guide rollers on the carriage with play moreover permits the manufacture of runner rails with greater manufacturing tolerances. The manufacturing costs for the runner rails can be lowered by way of this.

The arrangement of the carriage and the runner rail can moreover be designed such that a guide bar, which engages into the guide recess during the conveying movement of the carriage along the runner rail, has play towards the base of the guide recess.

The lateral play and/or radial play for example can be 0.1 mm or more, in particular 0.2 mm or more. The play for example can be 2 mm or less, in particular 1 mm or less.

The guidance of the carriages along the runner rail has been found to tolerate wear on the rollers and runner rail, thanks to the arrangement of the guide rollers on the carriage with play. Thus less disruption occurs, despite the wearing on the rollers and runner rail.

The carriage is designed as an outer runner. This means that the carriage embraces (engages around) the runner rail at the outside.

The carriage body in the cross-sectional profile of the two limbs and the connecting section in particular forms an embracing section, which is open at one side and is for embracing the runner rail. The embracing section in particular can be U-shaped.

The embracing section forms a rail receiving space, which is open at one side. The rollers are arranged towards the rail receiving space.

The carriage in particular includes a holding element arranged on the carriage body, for holding a conveyed object.

The holding element in particular serves for the suspended holding of a conveyed object for the purpose of a suspended conveying.

In particular, the holding element is arranged below the carriage body. The holding element in particular is arranged on the connecting section.

The holding element in particular is arranged on the carriage body at the outer side, i.e. outside the rail receiving space.

The holding element can be an integral part of the carriage body. The holding element can thus be moulded together with the carriage body with an injection moulding method.

The holding element however can also be attached onto the carriage.

The holding element for example can define a through-opening. The through-opening serves, for example, for hanging in a bow, a pocket or a bag. The holding element with the through-opening can be an eyelet for example.

The through-opening or the eyelet can be aligned perpendicularly to the running direction or along the running direction.

The holding element can moreover include a hook.

The holding element can also be designed for the clamped holding. The holding element can thus have a clamp or a gripper.

Other holding mechanisms, which function, for example, by way of magnetic forces, non-positive or positive connections etc., are likewise possible. The holding element can include a magnet, for example.

A driver contact element for creating a driving contact with a driver of a driver device can moreover also be arranged on the carriage body. The driver contact element, for example, can be a pin, a lug or a tongue. The driver contact element can be an integral part of the carriage body.

The carriage body can be of metal. The carriage body can be of plastic, in particular of a reinforced plastic.

The carriage body can be manufactured, for example, in a moulding method, in particular by injection moulding. The carriage body can also be manufactured from a pressed profile or an extruded profile. The carriage body can also be manufactured from re-shaped sheet metal.

The limbs of the carriage can define openings or recesses in a direction parallel to the rotation axes of the rollers, for the purpose of weight reduction. The limbs can thus have a framework-like construction with a closed outer frame and struts arranged therebetween.

The carriage body can be manufactured, for example, in a single-part manner. Thereby, one or more of the subsequent elements, as already mentioned above to some extent, can already be integrated into the single-part carriage body on manufacture:

holding element, such as hook or eyelet;
driver contact element, such as pin or hook;
connecting elements for connecting several carriages to one another;
pivot stubs for rollers.

The carriage in particular is designed as an individual carriage that is movable along a conveying track independently of other carriages in a conveying system. This means that the carriages in particular are not mechanically coupled directly or indirectly to one another in a permanent manner, during their conveying movement along the conveying path.

The carriages however can also be provided with connecting means that permit a connection of several carriages into a composition or group of several carriages.

Individual carriages in a composition or group of several carriages connected to one another can serve, for example, as spacers between two carriages. A spacer is characterised in that this is not loaded with a conveyed object.

The connecting means, which for example permit an articulated connection, are arranged on the carriage body, in particular on the connecting section.

Moreover, an electronically or optically readable identification element can be arranged on the carriage body. The identification element for example can be a data memory element, such as RFID transponder, or a barcode or a matrix code. The identification element can be attached onto the carriage body or integrated into this.

The identification elements for example serves for storing identification information concerning the carriage or the conveyed object conveyed by this. Moreover, information concerning the covered conveying path or the conveying path that is to be covered also can be stored in the identification element designed as a data memory element.

In a moulding method, such as injection moulding method for example, the identification element can be moulded into the carriage body or be peripherally moulded by this, and in this manner attached to the carriage body.

The invention moreover also relates to a conveying system, in particular to a suspended-conveying system, with a runner rail as well as at least one carriage.

The at least one carriage of the conveying system comprises a carriage body that is designed for embracing a runner rail and that includes a first and second limb, wherein the limbs are connected to one another by way of a transversely extending connecting section.

The first limb has a first roller pair, which is attached on its inner side. The second limb has a second roller pair, which is attached on its inner side. The first and the second roller pair of the two limbs are arranged equally and oppositely offset to one another in a crosswise manner.

The conveying system in now characterised in that in each case a first roller of the first and second roller pair is designed as a support roller, via which the load of the carriage can be transmitted onto the runner rail.

The second roller of the first and second roller pair is designed in each case as a guide roller for guiding the carriage along the runner rail.

The runner rail in particular forms a guide section, which cooperates with the guide rollers of the carriage for the purpose of guiding the carriage along the runner rail.

The respective guide roller and the runner rail or its guide section in particular are designed cooperating with one another in a manner such that in each case a limitation against a displacement of the carriage into the two directions, which are opposite to one another and parallel to the rotation axis of the guide roller is formed.

The conveying movement of the carriage is effected along the runner rail, which forms the conveying track.

The embracing section of the carriage in particular is open to the top. This means that the connecting section runs below the runner rail.

The runner rail forms running surfaces, in particular plane running surfaces for the support rollers. The support rollers and the runner rail in particular are designed cooperating with one another in a manner such that no axial, i.e. lateral guidance of the support rollers is formed.

The running surfaces in particular are formed as contact surfaces, on which the support rollers can lie.

According to a first further development, the runner rail forms guide bars for guiding the guide rollers along the guide bars. For this, the guide bars engage in guide recesses of the guide rollers.

The runner rail in each case has a guide bar assigned to the guide roller, in particular for each guide roller on the carriage.

The guide bar runs in the longitudinal direction of the runner rail. Accordingly, the guide bar in particular runs parallel to the conveying track.

The height of the guide bar in particular is larger than its width, for example at least twice as large. The guide bar in particular is designed as a guide strip.

A plastic profile can be placed onto the guide bar, for reducing the wear of the guide rollers that may have running surfaces of plastic, as well as for avoiding rolling noises. The plastic profile can be clamped onto the guide bar. The guide bar can however also be surrounded or coated with a plastic material in another manner.

The runner rail in particular can be a runner rail as is described in the international patent application WO/EP 2015/069156, which has not yet been published. The mentioned patent application is referred to concerning further details.

The runner rail can thus include a cross-sectional profile with at least three profile sections which are connected to one another. The profile sections include:

a first laterally outwardly open profile section with a first running surface for receiving a support roller of a first limb of the carriage;

a second laterally outwardly open profile section with a second running surface for receiving a support roller of a second limb of the carriage;

a third profile section, which is open in the vertical direction and is with two guide bars of receiving a guide roller on the first and second limb of the carriage in each case.

The first and the second profile section are hereby arranged mirror-symmetrically to a vertical middle longitudinal plane of the runner rail.

The third profile section can likewise be arranged mirror-symmetrically to the vertical middle longitudinal plane of the runner rail.

The first, second and third profile section in each case can form a cross-sectional profile of a U-shape. The U-shape includes a profile connecting section and profile limbs connecting thereto at both sides.

The lower profile limb of the first and second profile section in each case forms a running surface for the support rollers. The profile connecting sections of the first and the second profile section in particular run parallel to one another.

The profile limbs of the third profile section in each case form a guide bar for the guide rollers.

The connecting section of the first profile section and the connecting section of the second profile section in particular stand perpendicularly on the connecting section of the third profile section and abut on this.

The first and the second profile section can be distanced to one another and form an intermediate space extending along the runner rail. The intermediate space extending along the runner rail can be closed to the top/or to the bottom by way of a physical connection between the first and the second profile section.

Instead of guide bars, the runner rail according to the present invention can also form guide recesses, which run in the running direction and which are surrounded on both sides by a guide flank, for guiding the guide rollers in the guide recesses. The guide recesses in particular can be designed in a concave manner.

Rolling surfaces for the guide rollers can be formed in the guide recesses.

The rolling surfaces can be aligned perpendicularly with respect to the middle longitudinal plane of the carriage rolling along the runner rail. The rolling surfaces can run obliquely with respect to the middle longitudinal plane of the carriage rolling along the runner rail. The rolling surfaces in the cross sectional profile, are aligned, for example, parallel to the rotation axes of the guide rollers.

The running surfaces can be aligned perpendicularly with respect to the middle longitudinal plane of the carriage rolling along the runner rail. The running surfaces can run obliquely with respect to the middle longitudinal plane of the carriage rolling along the runner rail. The running surfaces in the cross-sectional profile are aligned, for example, parallel to the rotation axes of the support rollers.

The runner rail can be of plastic. The runner rail can be of metal, such as aluminium or steel, in particular stainless steel. The runner rail can be designed of one part or of several parts. The runner rail can be an extruded profile. The runner rail can be a shaped profile that is shaped, for example, from sheet metal.

The runner rail can be surface treated. A surface treatment however is not necessary with the application of stainless steel.

The conveying system can moreover include a driver device with drivers for driving (catching) the carriages along their conveying path.

Moreover, the conveying system can include at least one diverter for dividing a conveying track in the conveying direction into at least two separate conveying tracks.

The conveying system can moreover include at least one junction for leading together at least two conveying tracks in the conveying direction, into a common conveying track.

The conveying system can moreover include a read-out device for reading out the identification elements of the carriages. The read-out device can include at least one sensor for this.

The conveying system can be a suspended-conveying system. With suspended-conveying systems, the conveyed object is conveyed in a hanging, which is to say suspended manner. Hereby, the conveyed object is located below the carriage.

The conveying system can be a gravity conveying system. With gravity conveying systems, the carriages are driven along an inclined conveying section, in a manner assisted by gravity.

No additional mechanical stabilisation measures having the purpose of bringing the carriage onto a stable position or alignment in the running direction or holding it in such a position or alignment are necessary, due to the fact that the carriage is optimally stabilised on the runner rail thanks to the guide rollers as well as the crosswise offset arrangement of support rollers and guide rollers.

The carriage can moreover also accommodate larger loads due to the extremely stable guidance. The carriage according to the invention thus permits loads of up to 10 kg.

The particular design of the carriage, which permits an overlapping of the rollers with the carriage body of an adjacent, equally constructed carriage, apart from the optional mutual, vertical securing, also permits a compact and space-saving juxtaposition of the carriages along the conveying track or in a storage space.

A space-saving juxtaposition (rowing) of the carriages is particularly important in storage spaces, in which carriages with the conveyed goods are to be intermediately stored before the onward conveying.

A space-saving juxtaposition of the carriages is also important in empty-storage spaces, in which empty carriages are intermediately stored until their provision.

BRIEF DESCRIPTION OF THE DRAWINGS

The subject-matter of the invention is hereinafter explained in more detail by way of embodiment examples, which are represented in the accompanying drawings. In each case are represented schematically in:

FIG. 8 a front view of a fourth embodiment of a carriage led along a runner rail;

DETAILED DESCRIPTION OF THE INVENTION

Figure 1:
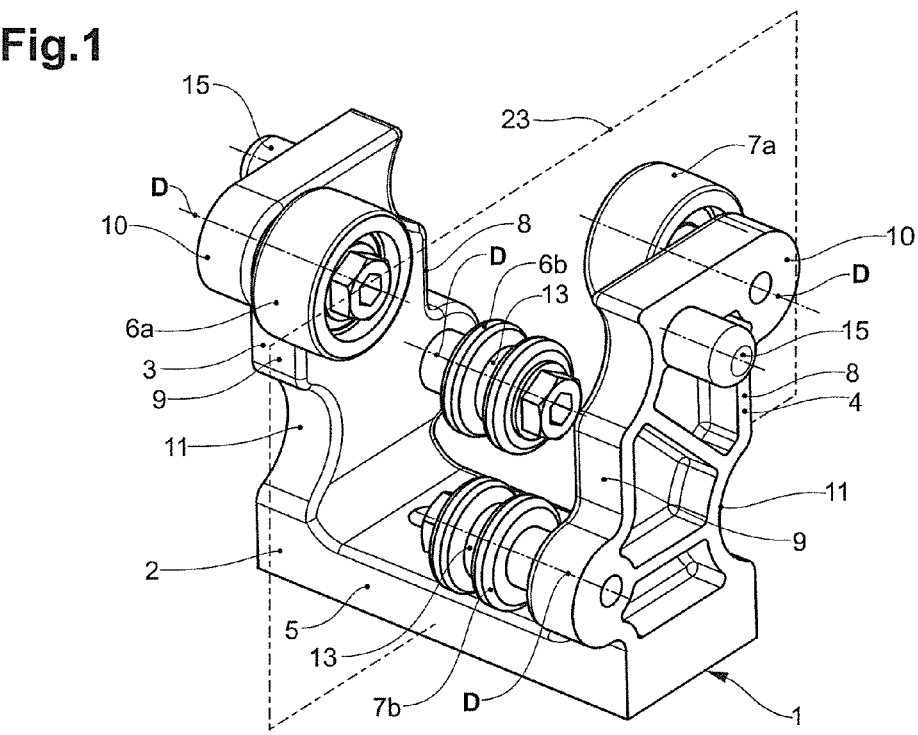
FIG. 1 a perspective view of a carriage according to the invention, according to a first embodiment.

The carriage 1, 51, 101, 151, 201, 251 according to FIGS. 1 to 10 has a carriage body 2, 102, 152, 202, 252, which is designed for embracing a runner rail 20, 120, 170, 220, 270. The carriage body 2, 102, 152, 202, 252 includes a first limb 3, 103, 153, 203, 253 and a second limb 4, 104, 154, 204, 254. The two limbs 3, 103, 153, 203, 253; 4, 104, 154, 204, 254 are connected to one another via a transversely extending connecting section 5, 105, 155, 205, 205, 255. The two limbs 3, 103, 153, 203, 253; 4, 104, 154, 204, 254 and the connecting section 5, 105, 155, 205, 205, 255 form an embracing section which is U-shaped in its cross-sectional profile. This embracing section encloses an open rail receiving space 12, 112, 162, 212, 262, through which the subsequently described runner rail 20, 210, 170, 220, 270 runs.

The limbs 3, 103, 153, 203, 253; 4, 104, 154, 204, 254 each have an inner side facing the runner rail 20, 210, 170, 220, 270 or the rail receiving space 12, 112, 162, 212, 262, as well as an outwardly facing outer side that is opposite to the inner side.

The first limb 3, 103, 153, 203, 253 includes a support roller 6a, 106a, 156a, 206a, 256a that is attached on its inner side, towards its free end. The first limb 3, 103, 153, 203, 253 further includes a guide roller 6b, 56b, 106b, 156b, 206b, 256b that is arranged on its inner side towards the connecting section 5, 105, 155, 205, 205, 255. The support roller 6a, 106a, 156a, 206a, 256a and the guide roller 6b, 56b, 106b, 156b, 206b, 256b of the first limb 3, 103, 153, 203, 253 form a first roller pair.

The second limb 4, 104, 154, 204, 254 likewise includes a support roller 7a, 107a, 157a, 207a, 257a that is attached on its inner side, towards the free end of the limb. The second limb 4, 104, 154, 204, 254 likewise has a guide roller 7b, 57b, 107b, 157b, 207b, 257b that is arranged on its inner side, towards the connecting section 5, 105, 155, 205, 205, 255. The support roller 7a, 107a, 157a, 207a, 257a and the guide roller 7b, 57b, 107b, 157b, 207b, 257b of the second limb 4, 104, 154, 204, 254 form a second roller pair.

An outwards directed driver contact element 15, 115, 165, 215, 265 in the embodiment of a dog is arranged in each case on the limb 3, 103, 153, 203, 253; 4, 104, 154, 204, 254, towards the free end section of the limb 3, 103, 153, 203, 253; 4, 104, 154, 204, 254, on its outer side. The driver contact element however not a necessary feature of the present invention and moreover also does not need to be attached on the carriage at the indicated location.

The guide rollers 6b, 7b; 56b, 57b; 106b, 107b; 156b, 157b; 206b, 207b; 256b, 257b on the two limbs 3, 103, 153, 203, 253; 4, 104, 154, 204, 254 serve for guiding the carriage 1, 51, 101, 151, 201, 251 along the runner rail 20, 210, 170, 220, 270. They are fastened on the carriage body 2, 202, 152, 202, 252 with lateral play.

The guide rollers 6b, 7b; 56b, 57b; 106b, 107b; 156b, 157b; 206b, 207b; 256b, 257b for this are rotatably mounted on a stationary, i.e. rotationally fixed fastening pivot and are fastened on the carriage body 2, 202, 152, 202, 252 via an in particular releasable screw connection.

The guide rollers 6b, 7b; 56b, 57b; 156b, 157b; 206b, 207b according to the embodiments according to FIGS. 1 to 8 each have a peripheral guide recess 13, 63, 163, 213, which is closed in the rotation direction and is for receiving the guide bar 21a, 21b; 171a, 171b; 221a, 221b of a runner rail 20, 170, 220. The guide recess 13, 63, 163, 213 is surrounded or surrounded on both sides by a guide flank 14a, 14b; 64a, 64b; 164a, 164b; 214a; 214b.

Figure 2:
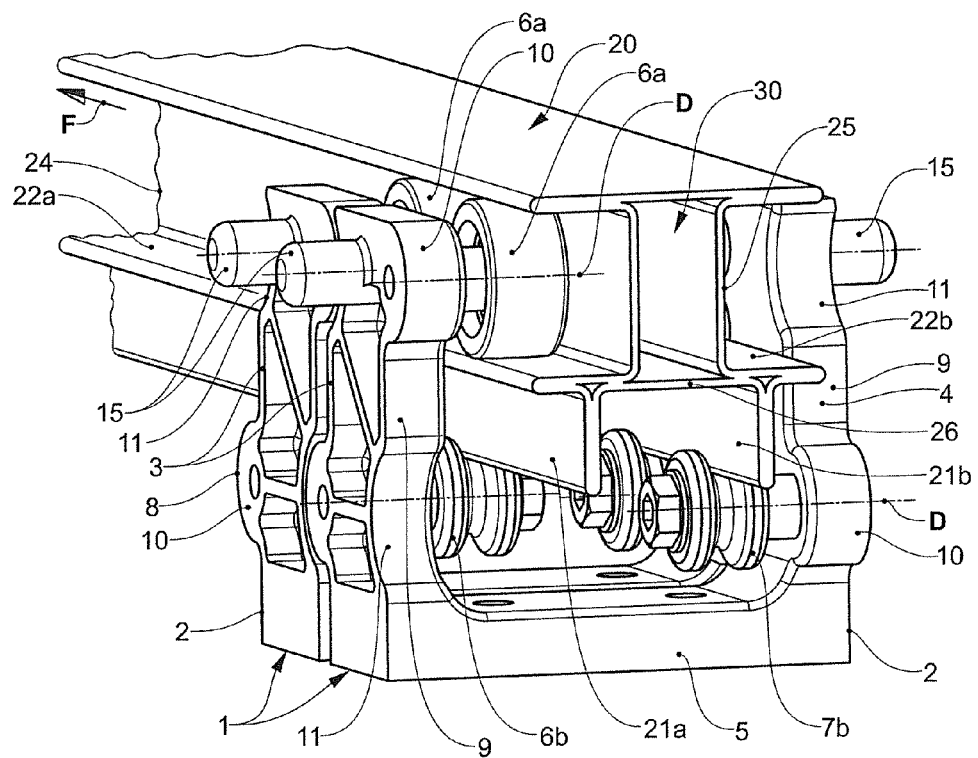
FIG. 2 a perspective view of the carriage according to FIG. 1, which is led along a runner rail.
Figure 3:
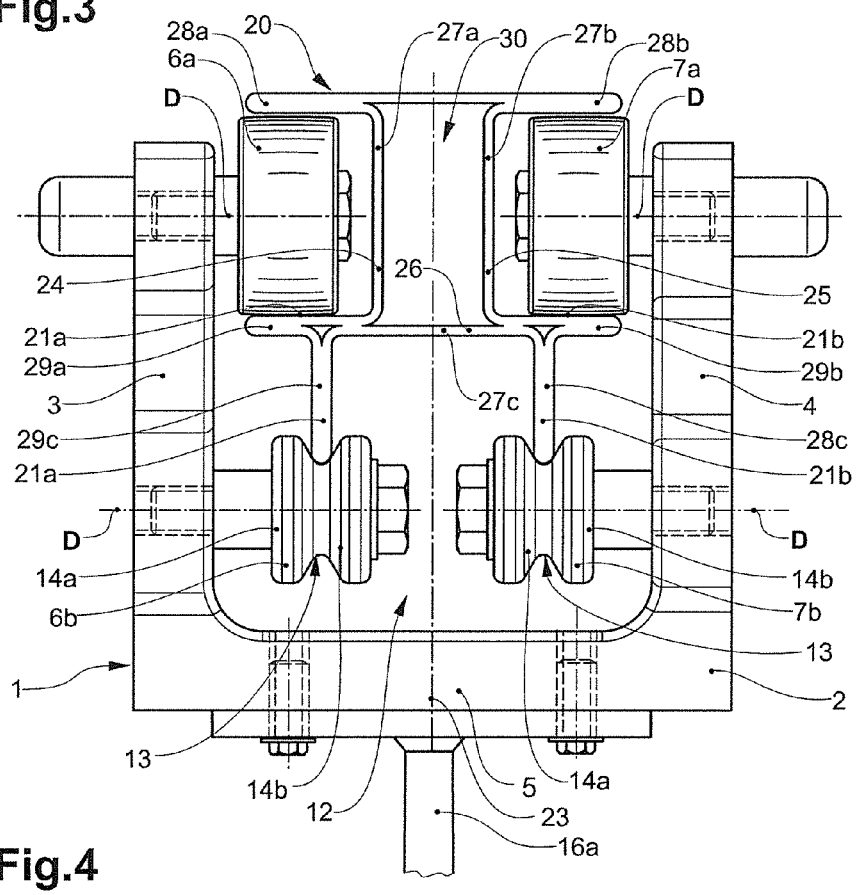
FIG. 3 a front view of the carriage according to FIGS. 1 and 2, which is guided along the runner rail.
Figure 4:
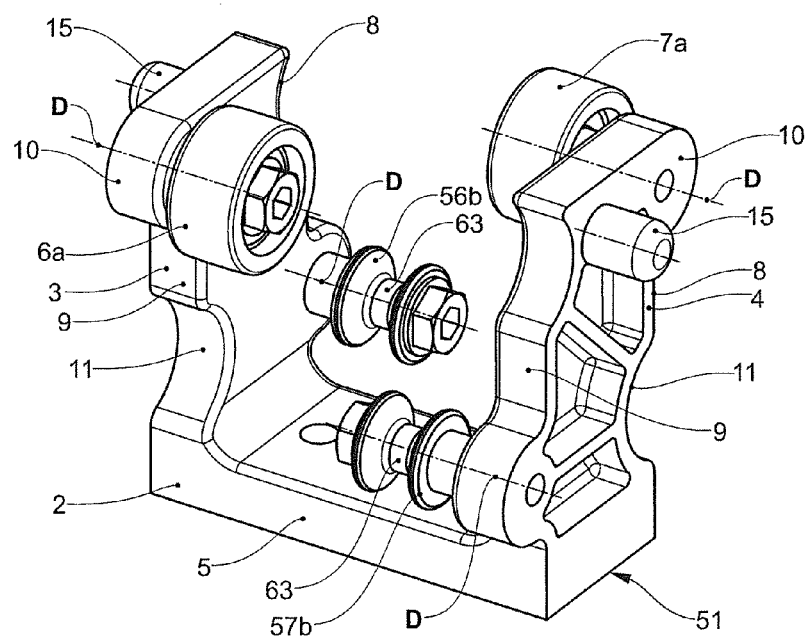
FIG. 4 a perspective view of a carriage according to the invention, according to a second embodiment.
Figure 5:
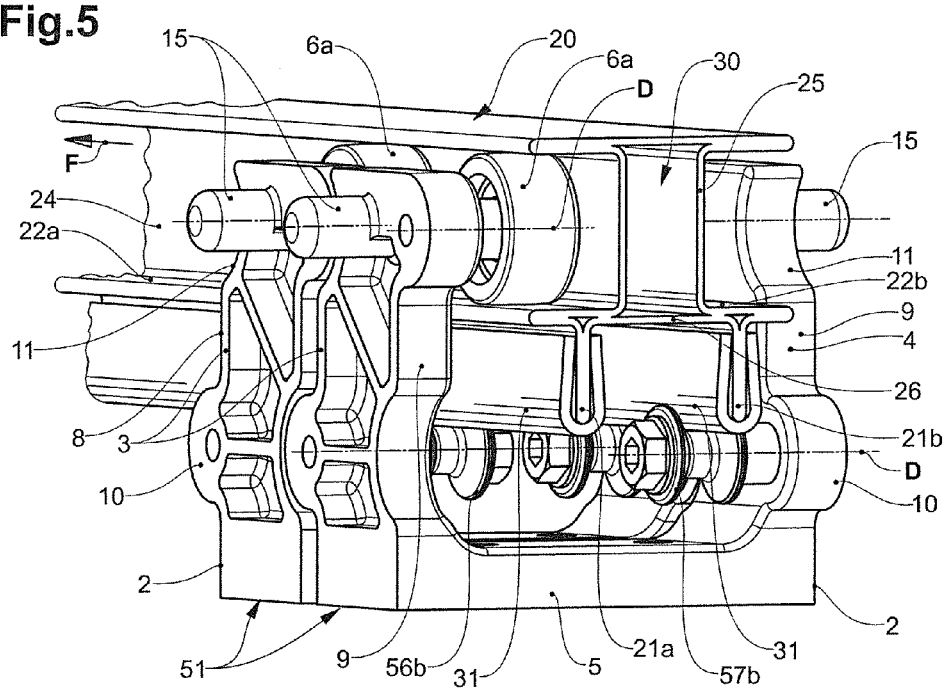
FIG. 5 a perspective view of the carriage according to FIG. 4, which is led along a runner rail.
Figure 6:
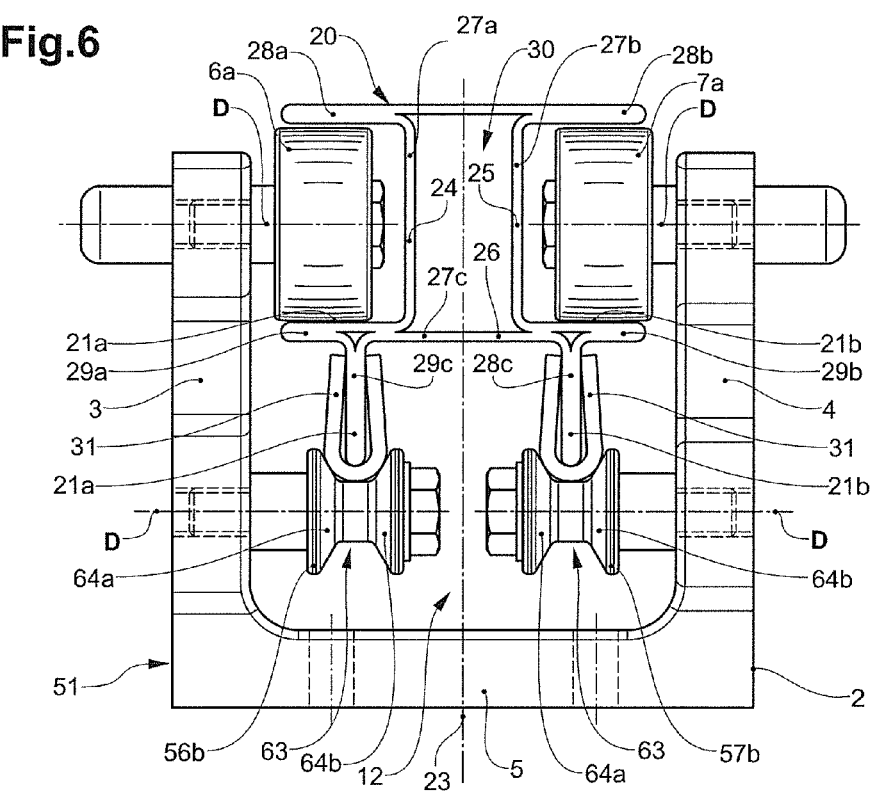
FIG. 6 a front view of the carriage according to FIGS. 4 and 5, which is led along the runner rail, FIG. 7 a front view of a third embodiment of a carriage led along a runner rail.

The guide rollers 56b, 57b; 206b, 207b according to the embodiment according to FIGS. 4 to 6 as well as FIG. 8 differ from the guide rollers 6b, 7b; 156b, 157b according to the embodiments according to FIGS. 1 to 3 as well as FIG. 7, in the width of the guide recesses 13, 63, 163, 213. The different width of the guide recesses 13, 63, 163, 213 is explained in yet more detail further below in the context of the runner rail 20, 170, 220.

In the embodiments according to FIGS. 1 to 7, the rotation axes D of the guide rollers 6b, 7b; 56b, 57b; 156b, 157b and of the support rollers 6a, 7a; 156a, 157a are aligned parallel to one another. The support rollers 6a, 7a; 156a, 157a and guide rollers 6b, 7b; 56b, 57b, 156b, 157b are moreover arranged in a standing manner.

In all embodiments, the two roller pairs 6a, 6b; 7a, 7b; 56a, 56b; 57a, 57b; 106a, 106b; 107a, 107b; 156a, 156b; 157a, 157b; 206a, 206b; 207a, 207b; 256a, 256b; 257a, 257b of the two limbs 3, 4; 103, 104; 153, 154; 203, 204; 253, 254 are arranged equally and oppositely offset to one another in a crosswise manner. This means that the roller pairs have an X-shaped arrangement in a parallel projection parallel to their rotation axes D.

The limbs 3, 4 each have a front limb face side 8 facing the running direction F and a rearward limb face side 9 facing oppositely to the running direction F (only shown in the embodiments according to FIGS. 1 to 6).

The contours of the limb face sides 8, 9 of a limb 3, 4 according to the two embodiments according to FIGS. 1 to 6 are each designed equally and oppositely to one another. By way of this, the contour of the front limb face side 8 of a trailing carriage 1, 51 can positively engage into the contour of the rear-side limb face side 9 of a directly leading, constructionally equal carriage 1, 51.

The front and rearward limb face sides 8, 9 moreover each have a circularly arched projection 10 as well as a circularly arched recess 11, which on the limb face side 8, 9 are arranged next to one another considered along the limb longitudinal axis. However, the projection and recess 10, 11 can also be designed differently than in a circularly arched manner.

The recess 11 and the projection 10 on the rearward limb face side 9 are arranged equally and oppositely to the recess 11 and the projection 10 on the front limb face side 8.

The projections 10 and the recesses 11 of the face side sections 8, 9 facing one another, of the limbs 3, 4 of two constructional equal carriages pushed onto one another along the running direction F, engage into one another on account of this.

The geometric rotation axes D of the support rollers 6a, 7a, and of the guide rollers 6b, 7b, 56b, 57b each lead through the mentioned projections 10.

The support rollers 6a, 7a of constructionally equal carriages 1, 51 pushed onto one another in the running direction F thereby at the inner side each overlap with the adjacent limb 3, 44 of the directly leading or trailing carriage 1, 51.

The runner rail 20 according to the two embodiments according to FIGS. 1 to 6 has a cross-sectional profile of at least three profile sections 24, 25, 26, which are connected to one another. The profile sections 24, 25, 26 include a firstly laterally outwardly open profile section 24 with a first running surface 22a for receiving the support roller 6a of the first limb 3 of the carriage 1, 51, further a second, laterally outwardly open profile section 25 with a second running surface 22b for receiving the support roller 7a of the second limb 4 of the carriage 1, 51, as well as a third profile section 26 which is open in the vertical direction and is with two guide bars 21a, 21b for receiving a guide roller 6b; 7b; 56b, 57b on the first and second limb 3, 4 of the carriage 1, 51 in each case.

The two first and second profile sections 24, 25 are arranged mirror-symmetrically to a vertical middle longitudinal plane 23 of the runner rail 20. Accordingly, the first and the second profile sections 24, 25 are open in directions which are opposite to one another.

The third profile section 26 is likewise arranged mirror-symmetrically to the vertical middle longitudinal plane 23 of the runner rail 20.

The three profile sections 24, 25, 26 are each designed in a U-shaped manner with regard to the cross-sectional profile. The U-shape in each case includes a profile connecting section 27a-27c and profile limbs 28a-28c; 29a-29c, which connect thereto on both sides.

The profile connecting sections 27a, 27b of the first and of the second profile section 24, 25 of the runner rail 20 stand perpendicularly on the profile connecting section 27c of the third profile section 26 and abut on this.

The first and second profile sections 24, 25 are moreover arranged spaced from one another and form a closed intermediate space 30, which extends in the longitudinal direction of the runner rail 20.

The lower profile limb 29a, 29b of the first and second profile section 24, 25 in each case forms the running surface 22a, 22b for the support rollers 6a, 7a. The profile connecting sections 27a, 27b of the first and second profile section run parallel to one another.

The profile limbs 28c, 29c of the third profile section 26 in each case form the guide bars 21a, 21b for the guide rollers 6b, 7b; 56b, 57b.

The runner rail 170 according to the embodiment according to FIG. 7 is designed as a U-profile that is open to the bottom. The U-profile has two downwardly directed profile limbs, which form the guide bars 171a, 171b for the guided receiving of a guide roller 156b, 157b in each case.

Figure 9:
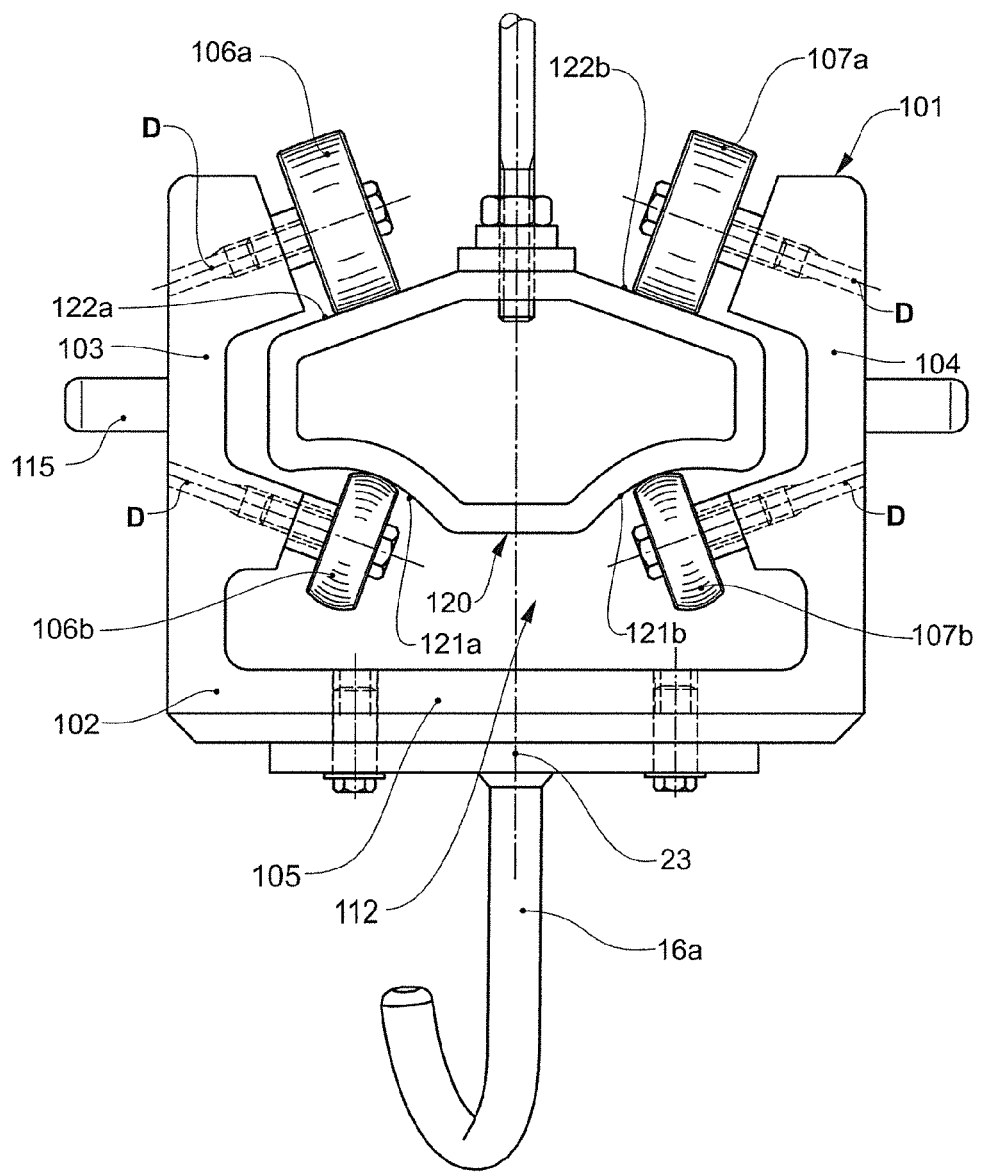
FIG. 9 a front view of a fifth embodiment of a carriage led along a runner rail.
Figure 10:
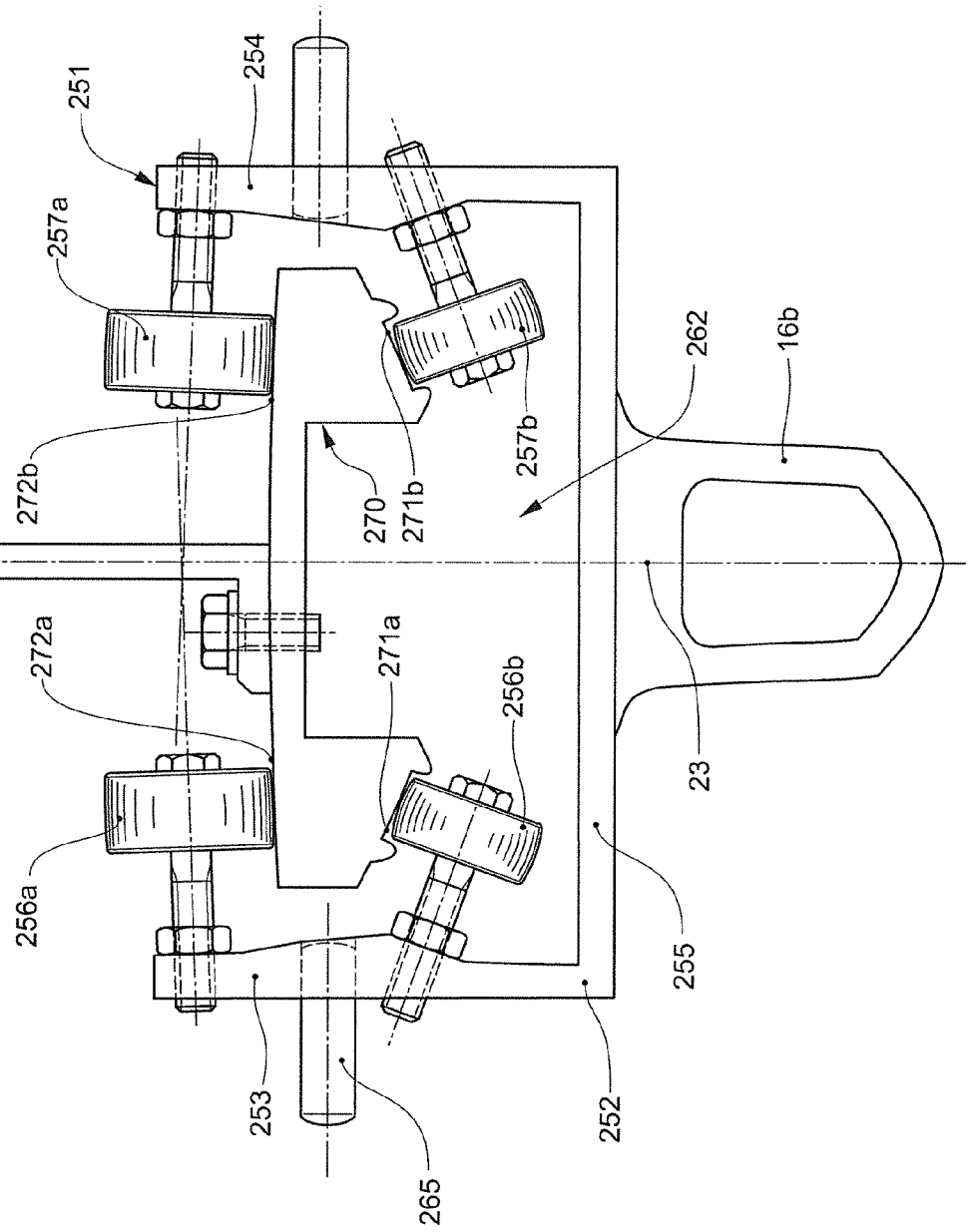
FIG. 10 a front view of a sixth embodiment of a carriage led along a runner rail.

According to the embodiments according to FIGS. 8 to 10, the rotation axes D of the pairings of guide roller and support roller 106a, 106b; 107a, 107b; 206a, 206b; 207a, 207b; 256a, 256b; 257a, 257b on one of the limbs 103, 104; 203, 204; 253, 254 are arranged at an acute angle to one another. The rotation axes D diverge in the direction of the rail receiving space 112, 212, 262.

In the embodiment according to FIG. 8, the guide rollers 206b, 207b are arranged standing. This means, the rotation axes D of the guide rollers 206b are aligned perpendicularly to the middle longitudinal plane 23. The rotation axes of the support rollers 206a, 207a and, with them, the running surfaces 222a, 222b of the runner rail 220 in contrast are arranged in an inclined manner with respect to the middle longitudinal plane 23.

The runner rail 220 here is likewise designed as a U-profile, which is open to the bottom. The U-profile likewise has two downwardly directed profile limbs, which form the guide bars 221a, 221b for the guided receiving of a guide roller 206b, 207b in each case.

The runner rail 20, 220 of the carriage 51, 201 according to the embodiment according to FIGS. 4 to 6 and 8 includes a U-shaped plastic profile 31, 231, which is placed upon the guide bar 21a, 21b; 221a, 221b in each case. The plastic profile 31, 231 is clampingly held on the guide bar 21a, 21b; 221a, 221b. Since the complete width of the guide bar 21a, 21b; 221a, 221b with the plastic profile 31, 231 increases due to this plastic profile, the guide recess 61, 213 of the guide rollers 56b, 57b; 206b, 207b of the carriage 51, 201 according to these two embodiments have a larger width compared to the guide rollers 6b, 7b; 156b, 157b of the carriage 1, 151 according to the embodiments according to FIGS. 1 to 3 and 7.

In contrast to the embodiment according to FIG. 8, with embodiment according to FIG. 9 the rotation axes D of the support rollers 106a, 107a as well as of the guide rollers 106b, 107b are arranged inclined with respect to the middle longitudinal plane 23. The running surfaces 122a, 122b for the support rollers 106a, 107a are accordingly likewise arranged in an inclined manner.

A holding hook 16a, which is attached on the connecting section 105 at the outer side, i.e. outside the rail receiving space 112 is also provided in the embodiment example according to FIG. 9. A holding hook 16a is shown in part also in FIG. 3.

The runner rail 120 here is designed as a simple hollow profile. In contrast to the embodiments according to FIGS. 1 to 8, the runner rail 120 does not form guide bars for the guide rollers 106b, 107b, but rather rolling surfaces 121a, 121b, which are arranged in a concave profile recess. The rolling surfaces 121a, 121b are accordingly delimited by two lateral, raised guide flanks.

In the embodiment according to FIG. 10, the rotation axes D of the support rollers 256a, 257a as well as of the guide rollers 256b, 257b are arranged inclined with respect to the middle longitudinal plane 23, analogously to the embodiment according to FIG. 9. The running surfaces 272a, 272b for the support rollers 256a, 257a are accordingly likewise arranged in an inclined manner. However, the inclination of the rotation axes D of the support rollers 256a, 267a and thus also of the running surfaces 272a, 272b is comparatively low.

The runner rail 270 likewise does not form guide bars for the guide rollers 256b, 257b, but rather rolling surfaces 271a, 271b, which are arranged in a profile recess. For this, the rolling surfaces 271a, 271b here are also delimited by lateral, raised guide flanks.

Moreover, in the embodiment example according to FIG. 10, a holding eyelet 16b attached on the connecting section 255 at the outer side, i.e. outside the rail receiving space 262 is provided. The eyelet 16b is aligned transverse to the running direction F.

The carriages 1, 51, 101, 151, 201, 251 according to the present embodiments according to FIGS. 1 to 10 now roll on the running surfaces 22a, 22b; 122a, 122b; 172a, 172b; 222a, 222b; 272a, 272b along the runner rail 20, 120, 170, 220, 270, via their support rollers 6a, 7a; 106a, 107a; 156a, 157a; 206a, 206b; 207a, 256a, 257a.

The carriages 1, 51, 101, 201, 251 thereby lie on the running surfaces 22a, 22b; 122a, 122b; 172a, 172b; 222a, 222b; 272a, 272b and thus on the runner rail 20, 120, 170, 220, 270, exclusively via their support rollers 6a, 7a; 106a, 107a; 156a, 157a; 206a, 207b; 207a, 256a, 257a.

Thereby, the load of the carriages 1, 51, 101, 201, 251 is transmitted onto the running surfaces 22a, 22b; 122a, 122b; 172a, 172b; 222a, 222b; 272a, 272b and thus onto the runner rail 20, 120, 170, 220, 270 exclusively via the support rollers 6a, 7a; 106a, 107a; 156a, 157a; 206a, 207a; 256a, 257a.

The guide rollers 6b, 7b; 56b, 57b; 106b, 107b; 156b, 157b; 206b, 207b; 256b, 257b in contrast are arranged below the respective guide bars 21a, 21b; 171a, 171b; 221a, 221b or rolling surfaces 121a, 121b; 271a, 271b and accordingly cannot transmit any load onto the runner rail 20, 120, 170, 220, 270.

According to the embodiments according to FIGS. 1 to 8, the guide bars 21a, 21b, 171a, 171b; 221a, 221b in each case engage from above into the guide recess 13, 163, 213 of the guide roller 6b, 7b, 56b, 57b; 156b, 157b; 206b, 207b, which is assigned to them and thus ensure a lateral guidance of the carriage 1, 51, 151, 2351. This lateral guidance e.g. prevents a lateral tilting of the carriage 1, 51, 151, 251.

According to the embodiments according to FIGS. 9 and 10, the guide rollers 106b, 107b; 256b, 257b below the runner rail 120, 170 are guided along the runner rail 120, 270, via rolling surfaces 121a, 121b; 271a, 271b, which are arranged in the profile recesses. The rolling surfaces 121a, 121b; 271a, 271b are accordingly flanked by lateral, raised guide flanks. A lateral guidance of the carriage 101, 251 is ensured by way of this, and this guidance, e.g., prevents a lateral tilting of the carriage 101, 251.

According to all embodiments according to FIGS. 1 to 10, tilting moments in and counter to the running direction F are accommodated by the crosswise equally and oppositely offset arrangement of the roller pairs 6a, 6b; 7a, 7b; 56a, 56b, 57a, 57b; 106a, 106b, 107a, 107b; 156a, 156b, 157a, 157b; 206a, 206b, 207a, 207b; 256a, 256b, 257a, 257b.

The invention claimed is:

1. A rail-guided suspended-conveying system, comprising a runner rail and at least one carriage with a carriage body, said carriage body being designed for embracing the runner rail and comprising a first limb and a second limb, wherein the limbs are connected to one another by a transversely extending connecting section, the first limb comprises a first roller pair, which is attached to an inner side of the first limb, the second limb comprises a second roller pair, which is attached to an inner side of the second limb, wherein the first and the second roller pairs of the two limbs are arranged equally and oppositely offset to one another in a crosswise manner, wherein in each case a first runner roller of the first roller pair and the second roller pair is designed as a support roller, via which a load of the carriage is transmitted onto the runner rail, wherein a running surface of the support rollers are plane or cambered, transversely to the rotation direction, and, in each case, a second roller of the first roller pair and the second roller pair is designed as a guide roller for guiding the carriage along the runner rail, wherein the guide rollers each comprise a guide recess, which is peripherally closed in a direction of rotation and which is surrounded on both sides by a guide flank, and wherein the runner rail forms guide bars which engage into the guide recesses in the guide rollers for guiding the carriage.

2. The rail-guided suspended-conveying system according to claim 1, wherein each guide roller forms a limitation that restricts displacement of the carriage in two directions, which are parallel to a rotation axis of the guide roller and which are opposite to one another.

3. The rail-guided suspended-conveying system according to claim 1, wherein the support rollers and the guide rollers are arranged in a standing manner.

4. The rail-guided suspended-conveying system according to claim 1, wherein the guide recess is a guide groove.

5. The rail-guided suspended-conveying system according to claim 1, wherein the guide flank is a roller flange.

6. The rail-guided suspended-conveying system according to claim 1, wherein rotation axes of the guide rollers and of the support rollers run parallel to one another.

7. The rail-guided suspended-conveying system according to claim 1, wherein rotation axes of the guide roller and of the support roller of a roller pairing enclose an acute angle in the parallel projection in a running direction, wherein the rotation axes in each case diverge towards the opposite limb.

8. The rail-guided suspended-conveying system according to claim 1, wherein the support roller is arranged on the limb, in each case, towards a free end of the limb, and the guide roller is arranged on the limb, in each case, towards the connecting section.

9. The rail-guided suspended-conveying system according to claim 1, wherein the guide rollers are fastened on the carriage body with at least one of lateral or radial play.

10. The rail-guided suspended-conveying system according to claim 1, wherein the limbs each comprise a front limb face side facing a running direction and a rearward limb face side facing oppositely to the running direction, and the two limb face sides of a limb form at least one pairing of a projecting and a recessed face side section, which at the limb face sides are designed and arranged equally and oppositely to one another, in a manner such that the projecting and recessed face side sections of the limbs of two equally constructed carriages pushed onto one another along the running direction engage into one another.

11. The rail-guided suspended-conveying system according to claim 1, wherein the limbs each comprise a front limb face side facing a running direction and a rearward limb face side facing oppositely to the running direction, and contours of the limb face sides of a limb are each designed equally and oppositely to one another in a manner such that the contour of the front limb faces side of a trailing carriage positively engages into the contour of rear-side limb face side of a directly leading, equally constructed carriage.

12. The rail-guided suspended-conveying system according to claim 1, wherein a design of the limbs of the carriage and the arrangement of the rollers on the limbs, is such that rollers of equally constructed carriages pushed on one another in a running direction overlap at the inner side in each case with an adjacent limb of a directly leading or trailing carriage.

13. The rail-guided suspended-conveying system according to claim 1, wherein the carriage comprises a holding element, which is arranged on the carriage body, for holding a conveyed object.

14. The rail-guided suspended-conveying system according to claim 1, wherein each of the guide rollers cooperate with the runner rail so as to provide a limitation against displacement of the carriage into two directions, which are opposite to one another and parallel to the rotation axis of the guide roller.

15. The rail-guided suspended-conveying system according to claim 1, wherein the runner rail forms running surfaces for the support rollers.

* * * * *